(12) United States Patent
Kong et al.

(10) Patent No.: US 11,606,153 B2
(45) Date of Patent: Mar. 14, 2023

(54) SYSTEM AND METHOD FOR TESTING MULTI-USER, MULTI-INPUT/MULTI-OUTPUT COMMUNICATION SYSTEMS

(71) Applicant: Keysight Technologies, Inc., Santa Rosa, CA (US)

(72) Inventors: Hong-Wei Kong, Beijing (CN); Ya Jing, Beijing (CN); Xu Zhao, Beijing (CN)

(73) Assignee: Keysight Technologies, Inc., Santa Rosa, CA (US)

( * ) Notice: Subject to any disclaimer, the term of this patent is extended or adjusted under 35 U.S.C. 154(b) by 534 days.

(21) Appl. No.: 15/531,421

(22) PCT Filed: Jan. 19, 2015

(86) PCT No.: PCT/US2015/011932
§ 371 (c)(1),
(2) Date: May 26, 2017

(87) PCT Pub. No.: WO2016/085531
PCT Pub. Date: Jun. 2, 2016

(65) Prior Publication Data
US 2017/0317769 A1   Nov. 2, 2017

(30) Foreign Application Priority Data
Nov. 28, 2014   (CN) .......................... 201410709758.2

(51) Int. Cl.
H04B 17/29   (2015.01)
H04B 17/15   (2015.01)
G06F 11/273   (2006.01)

(52) U.S. Cl.
CPC ......... H04B 17/29 (2015.01); G06F 11/2733 (2013.01); H04B 17/15 (2015.01)

(58) Field of Classification Search
CPC .... H04B 17/0085; H04B 17/15; H04B 17/21; H04B 17/29; G06F 11/2733
See application file for complete search history.

(56) References Cited

U.S. PATENT DOCUMENTS 7,515,563 B2   4/2009   Ponnekanti
8,331,869 B2   12/2012   Foegelle et al.
(Continued)

FOREIGN PATENT DOCUMENTS

CN   103532685 A   1/2014
CN   1004009811 A   8/2014
DE   WO 2014166552 A1 * 10/2014   ......... H04B 17/0085

OTHER PUBLICATIONS

International Search Report & Written Opinion dated Apr. 9, 2015 for PCT/US15/011932, 9 pages.
(Continued)

Primary Examiner — Yuwen Pan
Assistant Examiner — Fatuma G Sherif

(57) ABSTRACT

A test system for testing a device under test includes: a signal processor configured to generate a plurality of independent signals and to apply first fading channel characteristics to each of the independent signals to generate a plurality of first faded test signals; a test system interface configured to provide the plurality of first faded test signals to one or more signal input interfaces of the device under test (DUT); a second signal processor configured to apply second fading channel characteristics to a plurality of output signals of the DUT to generate a plurality of second faded
(Continued)

test signals, wherein the second fading channel characteristics are derived from the first fading channel characteristics; and one or more test instruments configured to measure at least one performance characteristic of the DUT from the plurality of second faded test signals.

19 Claims, 4 Drawing Sheets

(56) References Cited

U.S. PATENT DOCUMENTS

| | | | |
|---|---|---|---|
| 8,682,638 B2 | 3/2014 | Mlinarsky et al. | |
| 8,718,122 B2 | 5/2014 | Griesing et al. | |
| 2006/0229020 A1 | 10/2006 | Mlinarsky et al. | |
| 2009/0043528 A1* | 2/2009 | Asami | G01R 31/31924 702/124 |
| 2012/0100813 A1* | 4/2012 | Mow | H04B 17/12 455/67.12 |
| 2012/0134400 A1 | 5/2012 | Ding et al. | |
| 2012/0275506 A1 | 11/2012 | Ding et al. | |
| 2012/0302159 A1* | 11/2012 | Kottkamp | H04B 17/0085 455/9 |
| 2014/0242976 A1* | 8/2014 | Suenaga | H04W 24/06 455/423 |

OTHER PUBLICATIONS

Chinese Office Action and Search Report dated Feb. 6, 2020 for application No. 201410709758.2, with English translation, 17 pgs.
Chinese Office Action dated Dec. 19, 2020 for application No. 201410709758.2, 8 pgs.
Google translation of Chinese Office Action dated Dec. 19, 2020, 7 pgs.
Chinese Notice of Allowance dated Jun. 1, 2022, application No. 20140709758.2, 2 pgs.
English translation of Chinese Notice of Allowance, 2 pgs.
Notice of Rexamination dated Dec. 27, 2021, application No. 20140709758.2, 8 pgs.
English translation of Notice of Reexamination, 9 pgs.
Decision on Rejection dated Mar. 18, 2021, application No. 20140709758.2, 5 pgs.
Google Translation of Decision on Rejection, 5 pgs.

* cited by examiner

SYSTEM AND METHOD FOR TESTING MULTI-USER, MULTI-INPUT/MULTI-OUTPUT COMMUNICATION SYSTEMS

CROSS-REFERENCE TO RELATED APPLICATIONS

The present application is a National Stage Application under 35 U.S.C. § 371 of, and claims priority under 35 U.S.C. § 121 from, International Patent Application No. PCT/US15/011932 filed on Jan. 19, 2015. The entire disclosure of International Patent Application No. PCT/US15/011932 is specifically incorporated herein by reference. The present application also claims priority under 35 U.S.C. § 119(e) from Chinese Patent Application No. 201410709758.2 filed on Nov. 28, 2014. The entire disclosure of Chinese Patent Application No. 201410709758.2 is specifically incorporated herein by reference.

BACKGROUND

Communication demands, and particularly wireless communication demands, continue to increase. Next generation wireless communication systems, commonly referred to as "5G communication systems" are being developed, to meet these demands. One important technology to be adopted by 5G communication systems involves the use of base stations which have a large number of input and outputs (sometimes referred to as a massive MIMO communication system) to serve a large number of communication users. Massive MIMO makes a clean break from prior approaches by using a large excess of antennas and time division duplex operation to serve multiple active terminals (users). Extra antennas focus energy into ever-smaller regions of space to bring huge improvements in throughput and radiated energy efficiency. Such systems may have hundreds of transmit (Tx) and receive (Rx) channels.

In general, communication systems and devices, like other electronics, require testing and, in some cases, calibration. However, testing and calibration can present challenges in the case of a multi-user massive MIMO communication system or terminal which includes a large number of input and outputs. For example, the system performance evaluation depends on the wireless channel characteristics between the massive MIMO communication system and the terminals (users) with which it communicates, which can be different for different users and different inputs and outputs at the same time. So proper solutions for testing multi-user massive MIMO communication system performance are needed.

Thus it would be desirable to provide a more convenient and more reliable method and system to test and calibrate the performance of a multi-user, multi-input/multi-output communication system or device.

SUMMARY

In one aspect, a method is provided for testing a device under test (DUT), which may be a massive MIMO communication system or terminal. The method comprises: generating a plurality of independent signals; applying first fading channel characteristics to the independent signals to generate a plurality of first faded test signals; providing the plurality of first faded test signals to one or more signal input interfaces of the device under test (DUT); applying second fading channel characteristics to a plurality of output signals of the DUT to generate a plurality of second faded test signals, wherein the second fading channel characteristics are derived from the first fading channel characteristics; and measuring with one or more test instruments at least one performance characteristic of the DUT from the plurality of second faded test signals.

In some embodiments, measuring at least one performance characteristic includes measuring a signal-to-interference-and-noise ratio (SINR) of a plurality of channels of the DUT.

In some embodiments, the method further comprises: varying at least one of the first fading channel characteristics and the second fading channel characteristics; and measuring the SINR of the plurality of channels of the DUT with the varied at least one of the first fading channel characteristics and the second fading channel characteristics.

In some embodiments, providing the plurality of first faded test signals to one or more signal input interfaces of the DUT comprises providing the plurality of first faded test signals to one or more signal input interfaces of the DUT via an optical baseband input of the DUT.

In some embodiments, the method further comprises providing one or more baseband output signals of the DUT to one of the test instruments, and measuring at least one performance characteristic of a baseband processing module of the DUT in response to the plurality of first faded test signals.

In some embodiments, applying the first fading channel characteristics to each of the independent signals to generate the plurality of first faded test signals comprises: applying the first fading channel characteristics to each of the independent signals to generate a plurality of faded baseband uplink signals; and applying the plurality of faded baseband uplink signals to one or more RF signal generators to generate the plurality of first faded test signals as RF signals.

In some embodiments, applying the plurality of faded baseband uplink signals to one or more RF signal generators to generate the plurality of first faded test signals comprises providing each of the independent signals to a corresponding one of the RF signal generators, wherein each RF signal generator generates a corresponding one of the first faded test signals as a corresponding RF signal.

In some embodiments, the DUT includes a multiple-input, multiple output (MIMO) transceiver, and providing the plurality of first faded test signals to one or more signal input interfaces of the DUT comprises providing the plurality of first faded test signals to a plurality of RF inputs of the MIMO transceiver.

In some embodiments, the one or more test instruments includes one or more RF test instruments, the method further comprising providing one or more RF output signals of the DUT as one or more input signals to the one or more RF test instruments, and measuring at least one performance characteristic of the DUT from the plurality of second faded test signals includes measuring at least one performance characteristic of an RF processing module of the DUT with the one or more RF test instruments.

In some embodiments, the one or more test instruments includes one or more RF test instruments, and the method further comprises: providing one or more RF output signals of the DUT to the one or more RF test instruments; and applying second fading channel characteristics to a plurality of outputs of the one or more RF test instruments, wherein measuring at least one performance characteristic of the DUT in response to the plurality of faded test signals includes measuring at least one characteristic of the plurality of second independent faded test signals.

In another aspect, a test system is provided for testing a device under test. The test system comprises: one or more signal processors configured to generate a plurality of independent signals and to apply first fading channel characteristics to each of the independent signals to generate a plurality of first faded test signals; at least one test system interface configured to provide the plurality of first faded test signals to one or more signal input interfaces of the device under test (DUT); and one or more test instruments. The one or more signal processors are configured to apply second fading channel characteristics to a plurality of output signals of the DUT to generate a plurality of second faded test signals. The one or more signal processors are configured to derive the second fading channel characteristics from the first fading channel characteristics. The one or more test instruments are configured to measure at least one performance characteristic of the DUT from the plurality of second faded test signals.

In some embodiments, the one or more test instruments are configured to measure a signal-to-interference-and-noise ratio (SINR) of a plurality of channels of the DUT.

In some embodiments, wherein the one or more signal processors includes a first signal processor comprising memory and a digital processor configured to execute instructions stored in the memory to cause the digital processor to generate the plurality of first faded test signals.

In some embodiments, the digital processor is further configured to vary the first fading channel characteristics, wherein the one or more test instruments are further configured to measure the SINR of the plurality of channels of the DUT with the varied first fading channel characteristics.

In some embodiments, the one or more output signals generated by the DUT include one or more baseband output signals, and the one or more test instruments include one of more baseband test instruments configured to receive the one or more baseband output signals, and to measure at least one performance characteristic of the DUT from the one or more baseband output signals.

In some embodiments, the test system further comprises one or more RF signal generators, wherein the first signal processor is configured to apply the first fading channel characteristics to each of the independent signals to generate a plurality of faded baseband uplink signals, and wherein each of the one or more RF signal generators is configured to receive one or more of the plurality of faded baseband uplink signals and to generate therefrom the plurality of first faded test signals as RF signals.

In some embodiments, the test system further comprises one or more RF signal generators, wherein the one or more signal processors includes a first signal processor configured to apply the first fading channel characteristics to each of the independent signals to generate a plurality of faded baseband uplink signals, and wherein each of the RF signal generators is configured to receive one of the plurality of faded baseband uplink signals and to generate therefrom a corresponding one of the faded test signals as a corresponding RF signal.

In some embodiments, the DUT includes a multiple-input, multiple output (MIMO) transceiver, and the RF signal generators are configured to provide the plurality of faded test signals to a plurality of RF inputs of the MIMO transceiver.

In some embodiments, the one or more test instruments includes one or more RF test instruments, the RF test instruments being configured to receive one or more RF output signals of the DUT as one or more input signals to the one or more RF test instruments and to measure at least one performance characteristic of an RF processing module of the DUT.

BRIEF DESCRIPTION OF THE DRAWINGS

The example embodiments are best understood from the following detailed description when read with the accompanying drawing figures. In fact, the dimensions may be arbitrarily increased or decreased for clarity of discussion. Wherever applicable and practical, like reference numerals refer to like elements.

DETAILED DESCRIPTION

In the following detailed description, for purposes of explanation and not limitation, example embodiments disclosing specific details are set forth in order to provide a thorough understanding of an embodiment according to the present teachings. However, it will be apparent to one having ordinary skill in the art having had the benefit of the present disclosure that other embodiments according to the present teachings that depart from the specific details disclosed herein remain within the scope of the appended claims. Moreover, descriptions of well-known apparati and methods may be omitted so as to not obscure the description of the example embodiments. Such methods and apparati are clearly within the scope of the present teachings.

Unless otherwise noted, when a first device is said to be connected to a second device, this encompasses cases where one or more intermediate devices may be employed to connect the two devices to each other. However, when a first device is said to be directly connected to a second device, this encompasses only cases where the two devices are connected to each other without any intermediate or intervening devices. Similarly, when a signal is said to be coupled to a device, this encompasses cases where one or more intermediate devices may be employed to couple the signal to the device. However, when a signal is said to be directly coupled to a device, this encompasses only cases where the signal is directly coupled to the device without any intermediate or intervening devices.

Figure 1:
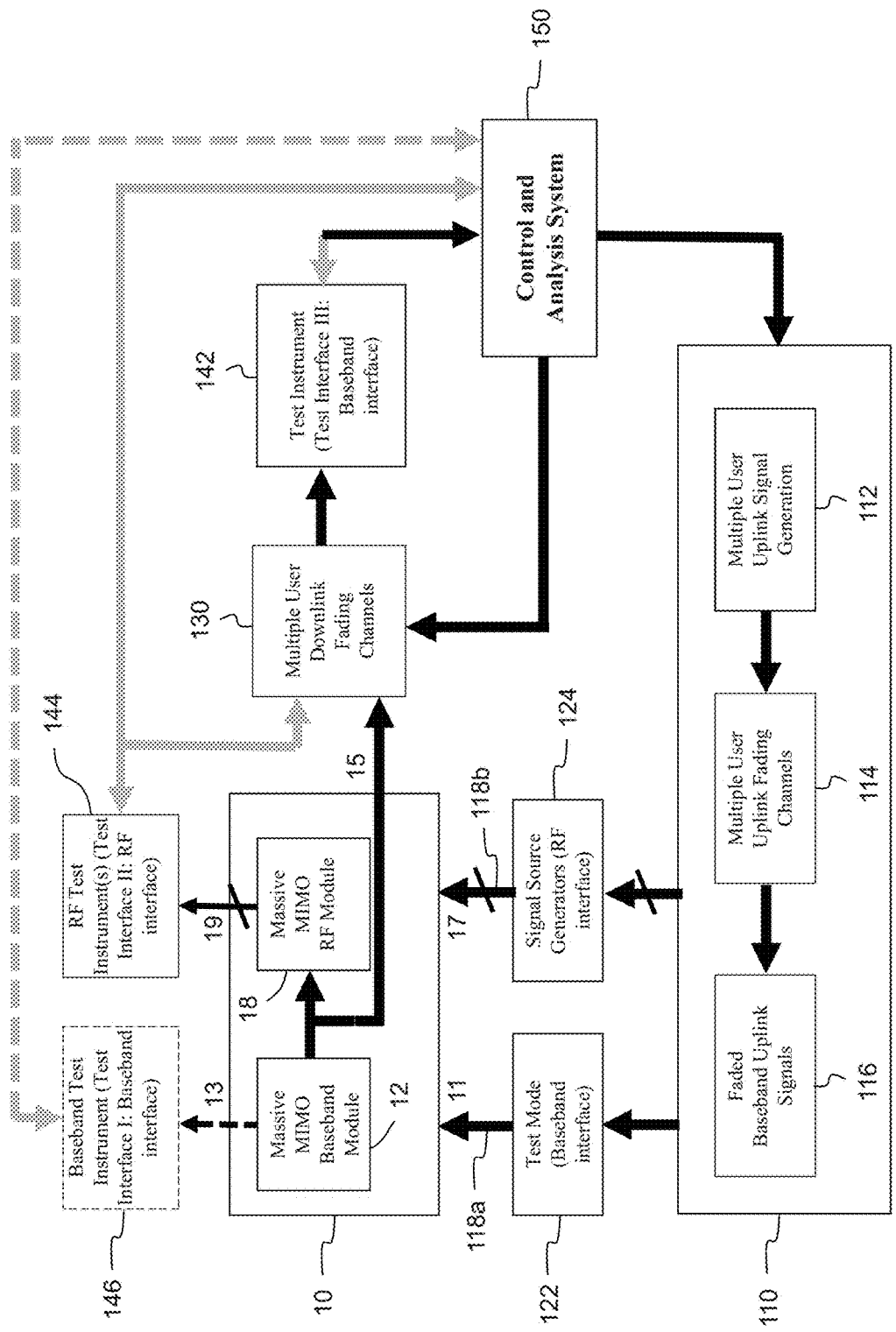
FIG. 1 illustrates an example embodiment of a test system for testing a multi-user, multi-input/multi-output (MIMO) communication system or device under test (DUT).

FIG. 1 illustrates an example embodiment of a test system 100 for testing a device under test (DUT) 10. Here, DUT 10 comprises a multi-user, multi-input/multi-output (MIMO) communication system including a MIMO transceiver, in particular a MIMO wireless RF transceiver. In some embodiments, DUT 10 may comprise a base station or repeater for a wireless communication system, such as a mobile telephony system.

DUT 10 includes a MIMO baseband module 12 communicating with baseband interfaces 11, 13 and 15 of DUT 10, and a MIMO RF module 18 communicating with RF inputs 17 and RF outputs 19 of DUT 10. Here, it is assumed that, in operation, RF inputs 17 and RF outputs 19 may be connected to a corresponding plurality of antennas for wireless communication, which antennas may be omitted for test purposes with test system 100. In example embodiments, baseband interfaces 11, 13 and 15 each may comprise a baseband interface for communicating one or more baseband data sequences, and/or may comprise an optical interface wherein the baseband data sequence(s) is/are provided on one or more optical signal carriers. In some embodiments, baseband interfaces 11, 13 and 15 may be realized as a single base band interface.

In some embodiments, DUT 10 comprises a massive MIMO system having a large number of RF inputs 17 and RF outputs 19 which are configured to be connected in operation to a large number of antennas. In some embodiments, DUT 10 may have at least N=64 RF inputs 17 and RF outputs 19. In some embodiments, DUT 10 may have N=400 or more RF inputs 17 and RF outputs 19.

Test system 100 includes: a first signal processor 110; a test mode baseband interface 122; a plurality of RF signal generators 124; a second signal processor 130, a plurality of test instruments including one or more baseband test instruments 142, one or more RF test instruments 144, and (optionally) one or more baseband test instruments 146; and a control and analysis subsystem 150.

First signal processor 110 may further include one or more digital microprocessors and memory, which may include volatile and/or nonvolatile memory, including random access memory (RAM), read only memory—for example electrically erasable programmable read only memory (EEPROM), FLASH memory, etc. In some embodiments, the memory may store instructions to be executed by the digital microprocessor(s) to cause the digital microprocessor(s) to perform one or more algorithms for generating a plurality of faded baseband uplink signals to be supplied to DUT 10, as discussed in greater detail below. First signal processor 110 may also include firmware, one or more application specific integrated circuits (ASICs), digital signal processors (DSPs), programmable gate arrays, etc.

In some embodiments, first signal processor 110 and second signal processor 130 may be combined into a single signal processor and/or may share some common elements or components, such as one or more shared digital microprocessors, shared memory, shared firmware elements, etc.

As illustrated in FIG. 1, first signal processor 110 is configured to generate a plurality of independent signals 112. In the illustrated embodiment, each of the independent signals 112 is a baseband signal and represents one of a plurality of user uplink signals for DUT 10 which, in operation, may be communicated from corresponding user terminals (e.g., mobile telephones and other wireless communication devices) to DUT 10 wirelessly via one or more RF channels. Since in operation user uplink signals from various user terminals are generated independently from each other, in a test mode test system 100, and in particular first signal processor 110, generates independent signals 112 to have characteristics (e.g., data sequences) which in general are independent of each other. For example, in some embodiments, independent signals 112 may include a plurality of different pseudorandom bit streams. In some embodiments, each of the independent signals 112 may be structured as a series of data packets conforming to a communication protocol which is employed by DUT 10. In that case, each of the independent signals may include overhead data, and payload data. Overhead data may include packet headers whose formats may be defined by a standard for communication protocol which is employed by DUT 10. In that case, the header format may be the same for all of the independent signals 112. Payload data may include a pseudorandom bit stream, as mentioned above.

First signal processor 110 is further configured to apply first fading channel characteristics 114 to independent signals 112 to generate a plurality of faded baseband uplink signals 116 which when combined represent a faded multiple user uplink signal. In some embodiments, first fading channel characteristics 114 may be determined or selected by control and analysis subsystem 150 (i.e., a user of control and analysis subsystem 150 via a user interface) and provided therefrom to first signal processor 110. First fading channel characteristics 114 may represent data determined from experiments or computer models to represent typical fading characteristics to which user data is exposed when being communicated wirelessly from a user terminal (e.g., a mobile telephone) to DUT 10. For example, in some embodiments some or all of first fading channel characteristics 114 may reflect a Rayleigh fading model for a communication channel between a transmit antenna of a user terminal (e.g., a mobile telephone or other wireless communication device) and a receive antenna of DUT 10. In some embodiments, a plurality of different possible fading channel characteristics may be stored in memory in first signal processor 110, and first signal processor may select the first fading channel characteristics 114 among those stored in memory. In some embodiments, first signal processor may receive selected first fading channel characteristics 114 from control and analysis subsystem 150.

In some embodiments, first signal processor 110 may generate independent signals 112 by a digital microprocessor executing a software algorithm. In that case, the software algorithm may include one routine to generate a plurality of pseudorandom bit steams as payload data, and may include another routine to encapsulate the payload data into a predefined packet format which is recognized and used by DUT 10. First signal processor 110 may also have stored in memory associated therewith the plurality of first fading channel characteristics 114, and may execute a software algorithm to apply each of the plurality of first fading channel characteristics 114 to a corresponding one of independent signals 112 to produce the plurality of faded baseband uplink signals 116.

In some embodiments, one or all of the characteristics of independent signals 112 may be designed by control and analysis subsystem 150 and communicated therefrom to first signal processor 110. In some embodiments, control and analysis subsystem 150 may comprise a general purpose computer including one or more digital microprocessors, memory (including volatile and/or nonvolatile memory), data storage (e.g., a hard disk or FLASH memory drive), one or more interfaces (e.g., an Ethernet port, wireless network interface, etc.) for communicating with first signal processor 110, second signal processor 130 and baseband test instruments 142, RF test instruments 144, and baseband test instruments 146. Control and analysis subsystem 150 may further comprise a user interface which may include one or more of a display, keyboard, keypad, touchscreen, mouse, trackball, microphone, etc. In some embodiments, a user may execute one or more software algorithms stored in memory and/or data storage of control and analysis subsystem 150 to design or set parameters for the independent signals 112 and/or first fading channel characteristics 114, and may communicate this data to first signal processor 110 via a communication interface.

In some embodiments, control and analysis subsystem 150 may communicate any or all of the data and parameters necessary for operation of first signal processor 110 on an as-needed basis. In some embodiments, all of the data and parameters necessary for operation of first signal processor 110 may be stored in nonvolatile memory in first signal processor 110.

As illustrated in FIG. 1, in one or more test modes, test system 100, and in particular first signal processor 110, may output the plurality of faded baseband uplink signals 116 via test mode baseband interface 122 as a plurality of first faded test signals 118a which are input to DUT 10 via baseband interface 11.

As also illustrated in FIG. 1, in one or more test modes, test system 100, and in particular first signal processor 110, may output the plurality of faded baseband uplink signals 116 to a plurality of RF signal generators 124. RF signal generators 124 may use the plurality of faded baseband uplink signals 116 to generate a plurality of first faded test signals 118b which are RF signals and which are input to DUT 10 via RF inputs 17.

Figure 2:
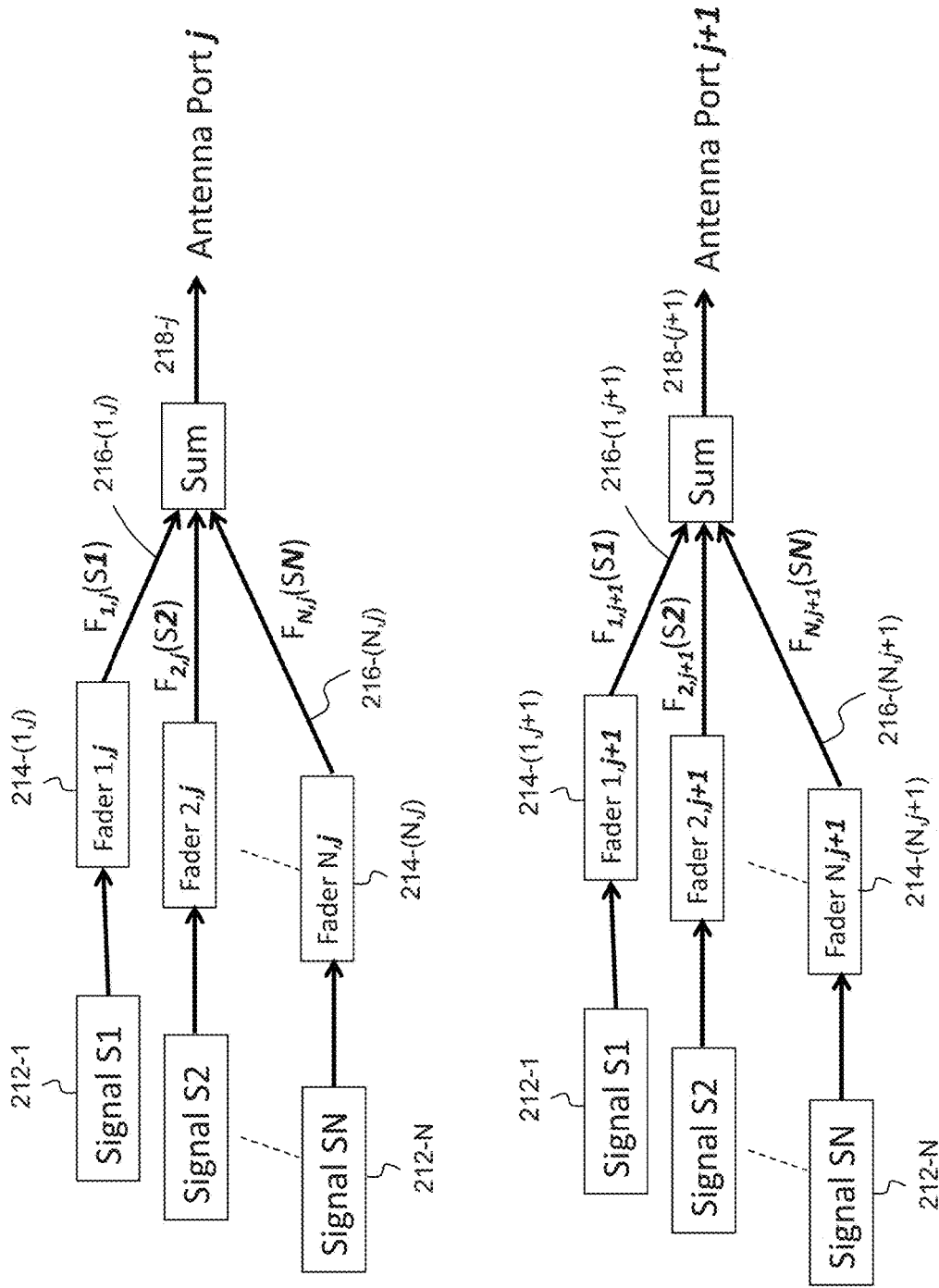
FIG. 2 illustrates an example embodiment of signal processing operations of a signal processor which may be included in the test system of FIG. 1.

FIG. 2 illustrates an example embodiment of signal processing operations of a signal processor 200 which may be included in the test system of FIG. 1 for generating a plurality of faded baseband uplink signals. Here it is assumed that DUT 10 includes a plurality of RF inputs 17 each corresponding to an antenna port of DUT 10, and a plurality of faded uplink signals are to be provided to each RF input 17 for each antenna port.

In operation, signal processor 200 (e.g., first signal processor 110) generates a plurality (N) of independent signals S1 . . . SN, labeled 212-1 through 212-N. Independent signals S1 . . . SN are each applied to a corresponding fader 214-(1,j) . . . 214-(N,j) to generate a plurality of faded baseband uplink signals 216-(1,j) . . . 216-(N,j) for antenna port J. That is, each of the faders 214-(1,j) . . . 214-(N,j) applies first fading characteristics to its corresponding independent signal S1 . . . SN to generate a plurality of faded baseband uplink signals 216-(1,j) . . . 216-(N,j) for antenna port J. The plurality of faded baseband uplink signals 216-(1,j) . . . 216-(N,j) are combined to produce a faded multiple user uplink signal 218-j for antenna port J. Similarly independent signals S1 . . . SN are each applied to a corresponding fader 214-(1,j+1) . . . 214-(N,j+1) to generate a plurality of faded baseband uplink signals 216-(1,j+1) . . . 216-(N,j+1) for antenna port J+1. That is, each of the faders 214-(1,j+1) . . . 214-(N,j+1) applies first fading characteristics to its corresponding independent signal S1 . . . SN to generate a plurality of faded baseband uplink signals 216-(1,j+1) . . . 216-(N,j+1) for antenna port J+1. The plurality of faded baseband uplink signals 216-(1,j+1) . . . 216-(N,j+1) are combined to produce a faded multiple user uplink signal 218-j+1 for antenna port J+1. This is repeated for all of the antenna ports of DUT 10. In one or more test modes, test system 100 may output the resulting faded multiple user uplink signals via test mode baseband interface 122 as a plurality of first faded test signals 118a, which are then input to DUT 10 via baseband interface 11. Furthermore, in one or more test modes, test system 100 may output the resulting faded multiple user uplink signals to a plurality of RF signal generators 124. RF signal generators 124 may use the resulting faded multiple user uplink signals to generate a plurality of first faded test signals 118b which are RF signals and which are input to DUT 10 via RF inputs 17.

Figure 3:
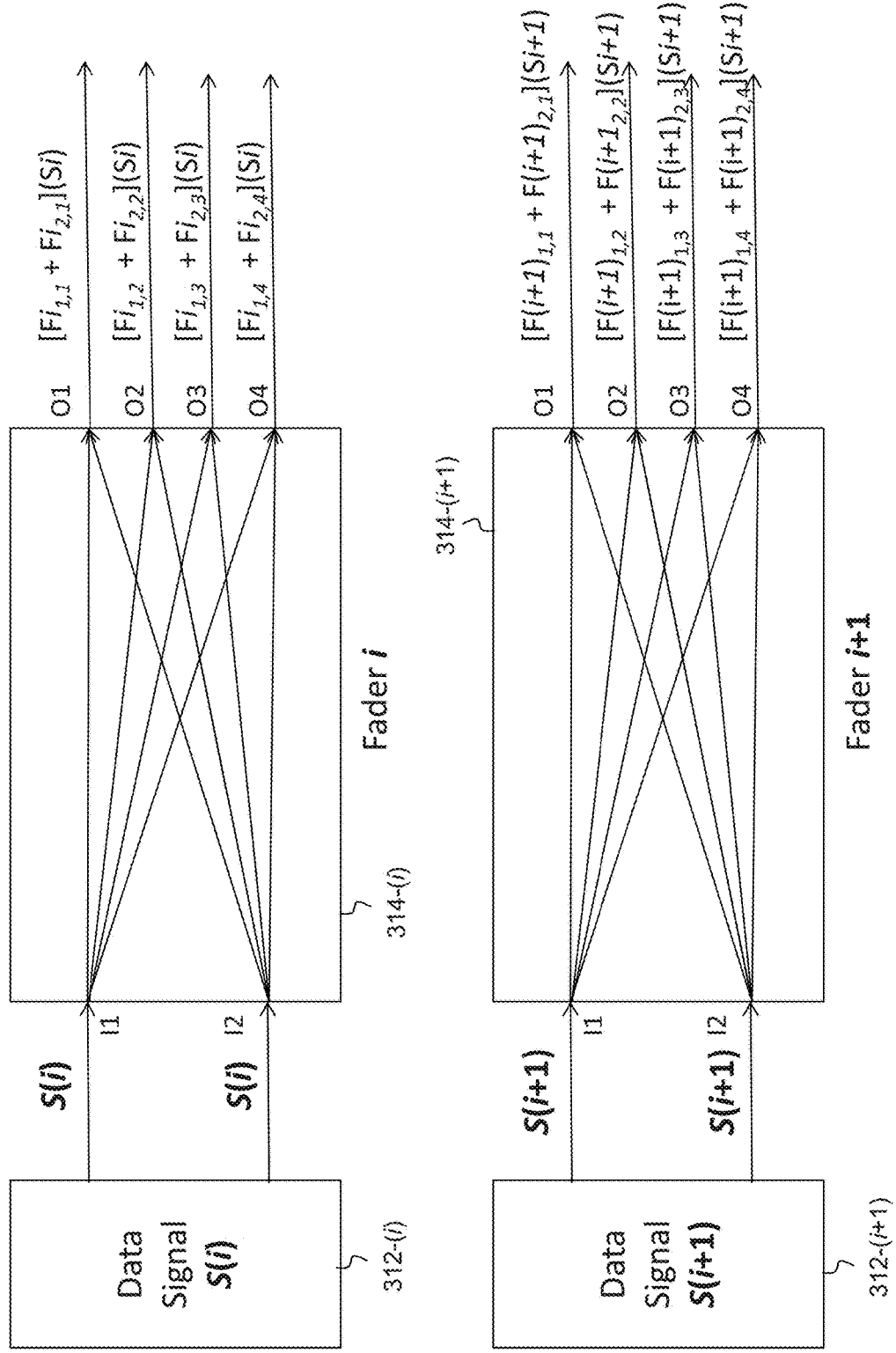
FIG. 3 illustrates another example embodiment of signal processing operations of a signal processor which may be included in the test system of FIG. 1.

FIG. 3 illustrates another example embodiment of signal processing operations of a signal processor 300 which may be included in the test system of FIG. 1 for generating a plurality of faded baseband uplink signals. In particular, FIG. 3 illustrates operations in an example situation where each of a plurality of faders operates on a signal communicated from one user terminal with two antenna ports to a DUT 10 with four antenna ports (i.e., four RF input ports 117).

In operation, a signal processor (e.g., first signal processor 110) generates a plurality (N) of independent signals S1 . . . SN, of which only two, S(i) and S(i+1) labeled 312-(i) and 312-(i+1), together with the corresponding faders i and (i+1) labeled 314-(i) and 314-(i+1), are shown in FIG. 3. Here, independent signal S(i) is modeled as having been transmitted from a user terminal having two antennas. Accordingly, each of the faders 314-(i) and 314-(i+1) has two inputs I1 and I2 and four outputs O1, O2, O3 and O4—one of each of the four antenna ports (i.e., RF input ports 117). In general, each of the faders 314-(i) and 314-(i+1) applies different fading channel characteristics to a signal as it passes from each one of the two input ports I1 and I2 to each one of the four output ports O1, O2, O3 and O4. That is, in general a total of eight different fading channel characteristics can be applied to the input signal for each fader 314-(i) and 314-(i+1).

As shown in FIG. 3, fader 314-(i) outputs four faded baseband uplink signals for the four antennas or RF inputs 17 of DUT 10: $[Fi_{1,1}+Fi_{2,1}](Si)$; $+[Fi_{1,2}+Fi_{2,2}]((Si)$; $[Fi_{1,3}+Fi_{2,3}](Si)$ and $[Fi_{1,4}+F_{2,4}](Si)$, respectively. Here, $Fi_{1,1}$ represents fading channel characteristics applied to the signal Si output by the first antenna A1 of the $i^{th}$ user terminal and received by the first antenna of DUT 10. Similarly, $Fi_{2,1}$ represents fading channel characteristics applied to the signal Si output by the second antenna A2 of the $i^{th}$ user terminal and received by the first antenna of DUT 10. Also, $Fi_{1,2}$ represents fading channel characteristics applied to the signal Si output by the first antenna A1 of the $i^{th}$ user terminal and received by the second antenna of DUT 10, and so forth.

Fader 314-(i+1) also outputs four faded baseband uplink signals for the four antennas or RF inputs 17 of DUT 10: $[F(i+1)_{1,1}+F(i+1)_{2,1}](Si+1)$; $[F(i+1)_{1,2}+F(i+1_{2,2}](Si+1)$; $[F(i+1)_{1,3}+F(i+1)_{2,3}](Si+1)$; and $[F(i+1)_{1,4}+F(i+1)_{2,4}](Si+1)$, respectively.

$[Fi_{1,1}+Fi_{2,1}](Si)$ is combined with $[F(i+1)_{1,1}+F(i+1)_{2,1}](Si+1)$ and the other signals from output O1 for all of the other faders 314 for all of the independent signals S1 . . . SN to produce a faded multiple user uplink signal for the first antenna port, similarly to what is shown in FIG. 2. This is repeated for all of the antenna ports of DUT 10.

In some embodiments, the operations of generating the independent signals 112 and applying first fading channel characteristics to the independent signals to generate a plurality of first faded test signals may be performed by one or more digital microprocessors of first signal processor 110 executing one or more software algorithms.

In one or more test modes, test system 100 may output the faded multiple user uplink signals via test mode baseband interface 122 as a plurality of first faded test signals 118a, which are then input to DUT 10 via baseband interface 11. Also, in one or more test modes, test system 100 may output the faded multiple user uplink signals to a plurality of RF signal generators 124. RF signal generators 124 may use the resulting faded multiple user uplink signals to generate a plurality of first faded test signals 118b which are RF signals and which are input to DUT 10 via RF inputs 17.

In operation, in a test mode test system 100 may apply the plurality of first faded test signals 118a to DUT 10 via baseband interface 11, and/or the plurality of first faded test signals 118b to DUT 10 via RF inputs 17. DUT 10 then may perform its normal signal processing operations on the received signals, first faded test signals 118a or 118b, and test system 100 may measure at least one performance characteristic of DUT 10, for example a signal-to-interference-and-noise ratio (SINR) of one or more or a plurality of channels of DUT 10.

For example, DUT 10 may perform its pre-coding process based on the first faded test signals 118a or 118b. Because the first faded test signals 118a and 118b are generated by first signal processor 110 using predetermined fading channel characteristics, test system 100—and in particular control and analysis subsystem 150—can use this information to deduce pre-coding matrices of MIMO baseband module 12 under various conditions. So, for example, in some embodiments baseband test instrument(s) 146 may check a pre-coding matrix of MIMO baseband module 12 of DUT 10, and one or more parameters indicating the signal quality after the pre-coding matrix may be measured or determined.

Meanwhile, RF performance of DUT 10 may be measured using one or more RF test instruments 144 which are connected to one or more RF outputs 19 of DUT 10.

Furthermore, "round trip" signal performance of DUT 10 may be measured or characterized using second signal processor 130, which may be configured to receive one or more output signals from DUT 10 and to apply second fading channel characteristics to the output signal(s) to generate one or more second faded test signals. Then baseband test instrument(s) 142 may be used to measure at least one performance characteristic of DUT 10 from the one or more second faded test signals, e.g., a plurality of second faded test signals.

Here, second signal processor 130 may receive one or more baseband output signals of DUT 10, and in particular baseband output signals of massive MIMO baseband module 12, via baseband interface 15. Also, RF test instrument(s) 144 may receive one or more RF output signals of DUT 10 via RF outputs 19, and may process (e.g., downconvert and/or demodulate) the one or more RF output signals to produce one or more corresponding baseband output signals which it provides to second signal processor 130.

Second signal processor 130 may be configured (for example by control and analysis subsystem 150) such that the second fading channel characteristics which are applied by second signal processor 130 to the output signals of DUT 10 (e.g., baseband output signals received directly via baseband interface 15 or RF output signals provided via RF outputs 19 and processed to baseband by RF test instrument(s) 144) are derived from the first fading channel characteristics 114 which were applied by first signal processor 110 to independent signals 112. In particular, in some cases the second fading channel characteristics which are applied to output signals of DUT 10 by second signal processor 130 may be the reciprocal or inverse of the first fading channel characteristics 114.

Second signal processor 130 outputs one or more second faded test signals to one or more baseband test instrument(s) 142. Baseband test instrument(s) 142 may measure at least one performance characteristic of DUT 10 from the one or more second faded test signals, e.g., a plurality of second faded test signals, under control of control and analysis subsystem 150.

Control and analysis subsystem 150 may be connected to each of the baseband test instrument(s) 142, RF test instrument(s) 144, and optional baseband test instrument(s) 146 and thereby may control one or more operating parameters of these instruments in a test mode, including for example programming the instruments to perform a variety of operations as desired to implement one or more tests to measure one or more performance characteristics of DUT 10. Control and analysis subsystem 150 may execute one or more software routines to cause test system 100 to perform desired tests on DUT 10.

Figure 4:
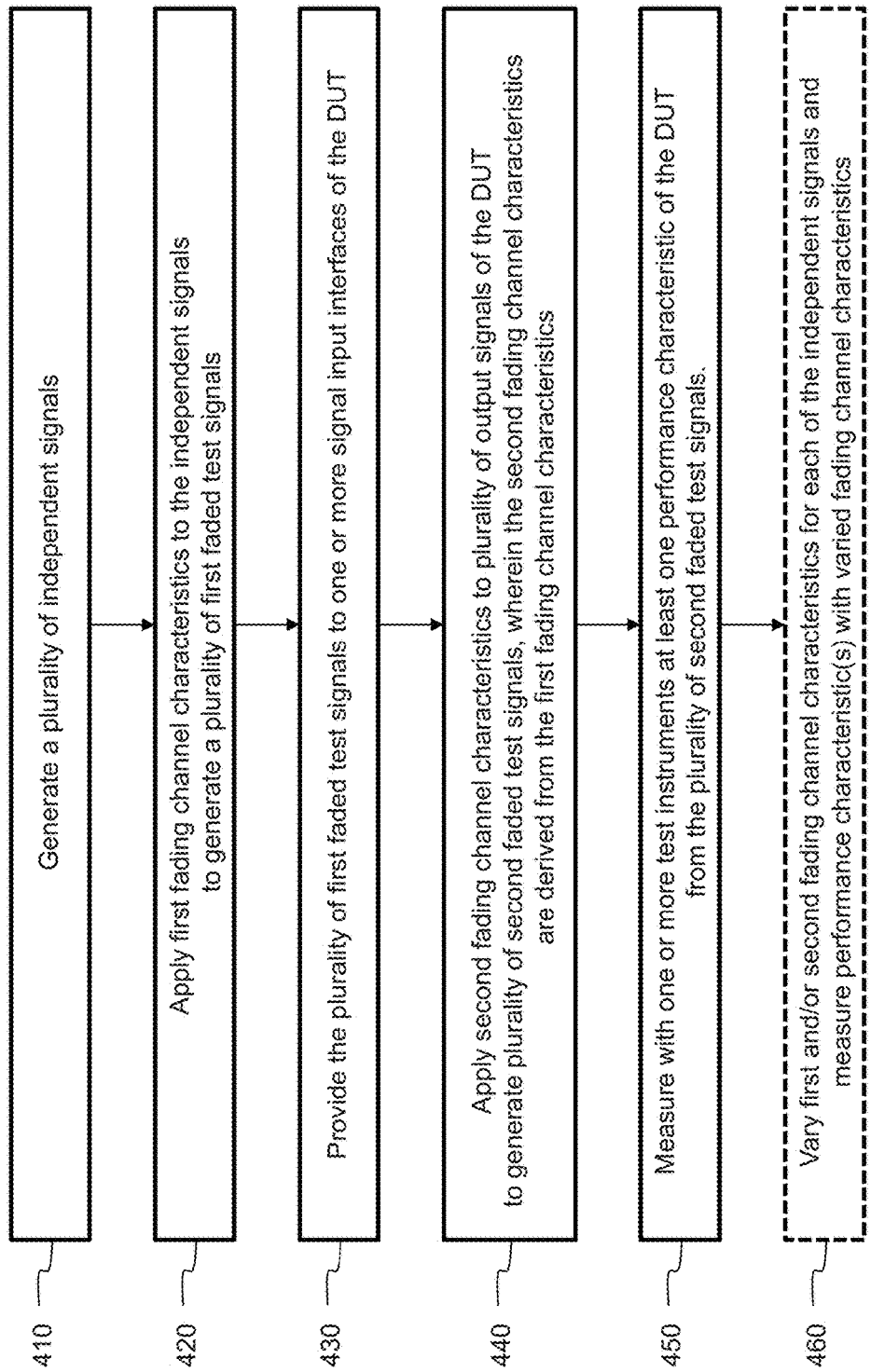
FIG. 4 is a flowchart of an example embodiment of a method of testing a DUT, such as a MIMO communication system.

FIG. 4 is a flowchart of an example embodiment of a method 400 of testing DUT 10.

In an operation 410, a test system (e.g., test system 100) generates a plurality of independent signals (e.g., independent signals 112).

In an operation 420, a test system (e.g., test system 100) applies a plurality of first fading channel characteristics (e.g., first fading channel characteristics 114) to the independent signals 112. For example, in some embodiments, control and analysis subsystem 150 selects a plurality of first fading channel characteristics and communicates them to first signal processor 110, for example under user control via a user interface of control and analysis subsystem 150 or automatically under control of a software routine executed by control and analysis subsystem 150. In other embodiments, a plurality of possible first fading channel characteristics may be stored in memory of first signal processor 110 and first fading channel characteristics for each of the independent signals 112 may be selected from those stored in memory by a digital microprocessor of first signal processor 110 executing a software algorithm.

In an operation 430, a test system (e.g., test system 100) provides the plurality of first faded test signals to one or more signal input interfaces of DUT 10. For example, test system 100 may provide the plurality of first faded test signals as one or more baseband signals to DUT 10 via baseband interface 11. Also, test system 100 may provide the plurality of first faded test signals to DUT 10 as RF signals via RF inputs 17.

In an operation 440, a test system (e.g., test system 100) applies second fading channel characteristics to a plurality of output signals of DUT 10 to generate a plurality of second faded test signals. Here, the second fading channel characteristics are derived from the first fading channel characteristics. In some embodiments, the second fading channel characteristics may be the reciprocal or inverse of the first fading channel characteristics 114.

In an operation 450, one or more test instruments (e.g., baseband test instrument(s) 142 and/or RF test instrument(s) 144) of a test system (e.g., test system 100) measure at least one performance characteristic of DUT 10 from the plurality of second faded test signals. In some embodiments, the one or more performance characteristics may include an output power level, an occupied bandwidth, a signal-to-noise ratio (SNR), a harmonic output level, a harmonic distortion, a signal-to-noise-plus-interference ratio (SNIR), a bit error rate (BER), etc. of an output signal of DUT 10. In some embodiments, test system 100 may deduce pre-coding matrixes of MIMO baseband module 12 of DUT 10 under various conditions, such as various fading channel characteristics being applied to the different independent signals 112.

In an optional operation 460, a test system (e.g., test system 100) may vary first and/or second fading channel characteristics for each of the independent signals and measure the one or more performance characteristic(s) with the varied fading channel characteristics. Thus a test system may ascertain the effect that various radio channel propagation conditions may have on one or more of the performance characteristics of DUT 10.

While example embodiments are disclosed herein, one of ordinary skill in the art appreciates that many variations that are in accordance with the present teachings are possible and remain within the scope of the appended claims. The invention therefore is not to be restricted except within the scope of the appended claims.

The invention claimed is:

1. A method of testing a device under test, the method comprising:
   generating a plurality of independent signals;
   applying first fading channel characteristics to the independent signals to generate a plurality of first faded test signals;
   providing the plurality of first faded test signals to one or more signal input interfaces of the device under test (DUT);
   applying second fading channel characteristics to a plurality of output signals of the DUT to generate a plurality of second faded test signals, wherein the second fading channel characteristics are derived from the first fading channel characteristics; and
   measuring with one or more test instruments at least one performance characteristic of the DUT from the plurality of second faded test signals.

2. The method of claim 1, wherein measuring at least one performance characteristic includes measuring a signal-to-interference-and-noise ratio (SINR) of a plurality of channels of the DUT.

3. The method of claim 2, further comprising:
   varying at least one of the first fading channel characteristics and the second fading channel characteristics; and
   measuring the SINR of the plurality of channels of the DUT with the varied at least one of the first fading channel characteristics and the second fading channel characteristics.

4. The method of claim 1, wherein providing the plurality of first faded test signals to one or more signal input interfaces of the DUT comprises providing the plurality of first faded test signals to one or more signal input interfaces of the DUT via an optical baseband input of the DUT.

5. The method of claim 1, further comprising providing one or more baseband output signals of the DUT to one of the test instruments, and measuring at least one performance characteristic of a baseband processing module of the DUT in response to the plurality of first faded test signals.

6. The method of claim 1, wherein applying the first fading channel characteristics to each of the independent signals to generate the plurality of first faded test signals, comprises:
   applying the first fading channel characteristics to each of the independent signals to generate a plurality of faded baseband uplink signals; and
   applying the plurality of faded baseband uplink signals to one or more RF signal generators to generate the plurality of first faded test signals as RF signals.

7. The method of claim 6, wherein applying the plurality of faded baseband uplink signals to one or more RF signal generators to generate the plurality of first faded test signals comprises providing each of the independent signals to a corresponding one of the RF signal generators, wherein each RF signal generator generates a corresponding one of the first faded test signals as a corresponding RF signal.

8. The method of claim 7, wherein the DUT includes a multiple-input, multiple output (MIMO) transceiver, and wherein providing the plurality of first faded test signals to one or more signal input interfaces of the DUT comprises providing the plurality of first faded test signals to a plurality of RF inputs of the MIMO transceiver.

9. The method of claim 6, wherein the one or more test instruments includes one or more RF test instruments, the method further comprising providing one or more RF output signals of the DUT as one or more input signals to the one or more RF test instruments, and wherein measuring at least one performance characteristic of the DUT from the plurality of second faded test signals includes measuring at least one performance characteristic of an RF processing module of the DUT with the one or more RF test instruments.

10. The method of claim 6, wherein the one or more test instruments includes one or more RF test instruments, the method further comprising:
    providing one or more RF output signals of the DUT to the one or more RF test instruments; and
    measuring the at least one performance characteristic of the DUT using the one or more RF test instruments.

11. A test system for testing a device under test, the test system comprising:
    one or more signal processors configured to generate a plurality of independent signals and to apply first fading channel characteristics to each of the independent signals to generate a plurality of first faded test signals;
    at least one test system interface configured to provide the plurality of first faded test signals to one or more signal input interfaces of the device under test (DUT); and
    one or more test instruments,
    wherein the one or more signal processors are configured to apply second fading channel characteristics to a plurality of output signals of the DUT to generate a plurality of second faded test signals,
    wherein the one or more signal processors are configured to derive the second fading channel characteristics from the first fading channel characteristics, and
    wherein the one or more test instruments are configured to measure at least one performance characteristic of the DUT from the plurality of second faded test signals.

12. The test system of claim 11, wherein the one or more test instruments are configured to measure a signal-to-interference-and-noise ratio (SINR) of a plurality of channels of the DUT.

13. The test system of claim 12, wherein the one or more signal processors includes a first signal processor comprising memory and a digital processor configured to execute instructions stored in the memory to cause the digital processor to generate the plurality of first faded test signals.

14. The test system of claim 13, wherein the digital processor is further configured to vary the first fading channel characteristics, wherein the one or more test instruments are further configured to measure the SINR of the plurality of channels of the DUT with the varied first fading channel characteristics.

15. The test system of claim 11, wherein the one or more output signals generated by the DUT include one or more baseband output signals, and the one or more test instruments include one of more baseband test instruments configured to receive the one or more baseband output signals, and to measure at least one performance characteristic of the DUT from the one or more baseband output signals.

16. The test system of claim 11, further comprising one or more RF signal generators,
    wherein the one or more signal processors is configured to apply the first fading channel characteristics to each of the independent signals to generate a plurality of faded baseband uplink signals, and
    wherein each of the one or more RF signal generators is configured to receive one or more of the plurality of faded baseband uplink signals and to generate therefrom the plurality of first faded test signals as RF signals.

17. The test system of claim 16, further comprising one or more RF signal generators, wherein the one or more signal processors includes a first signal processor configured to apply the first fading channel characteristics to each of the independent signals to generate a plurality of faded baseband uplink signals, and wherein each of the RF signal generators is configured to receive one of the plurality of faded baseband uplink signals and to generate therefrom a corresponding one of the first faded test signals as a corresponding RF signal.

18. The test system of claim 17, wherein the DUT includes a multiple-input, multiple output (MIMO) transceiver, and wherein the RF signal generators are configured to provide the plurality of first faded test signals to a plurality of RF inputs of the MIMO transceiver.

19. The test system of claim 16, wherein the one or more test instruments includes one or more RF test instruments, the RF test instruments being configured to receive one or more RF output signals of the DUT as one or more input signals to the one or more RF test instruments and to measure at least one performance characteristic of an RF processing module of the DUT.

\* \* \* \* \*